D. WHITLOCK.
Mechanism for Operating Sewing-Machines.
No. 134,780. Patented Jan. 14, 1873.
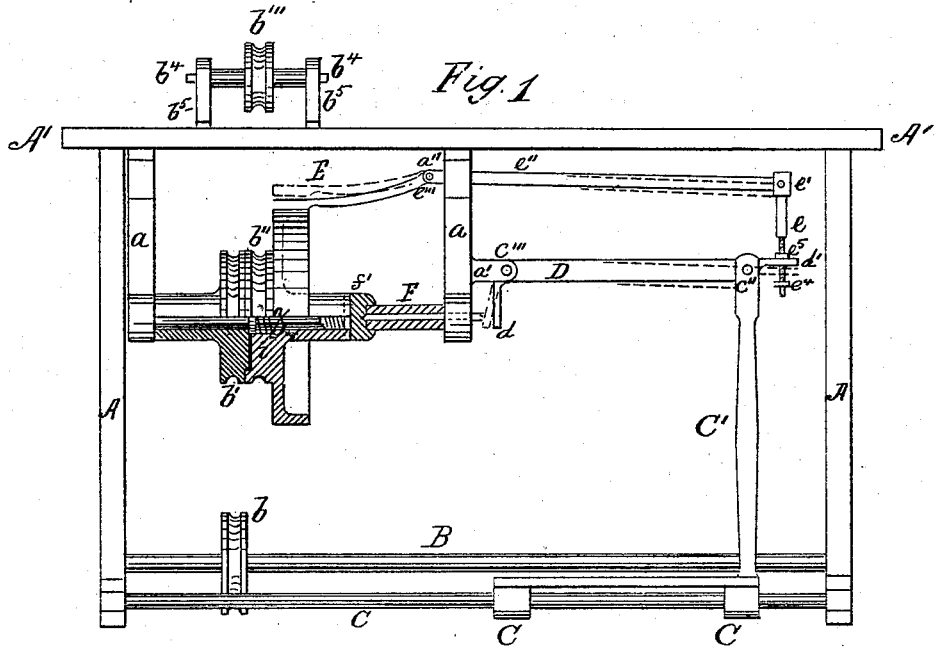
Fig. 1
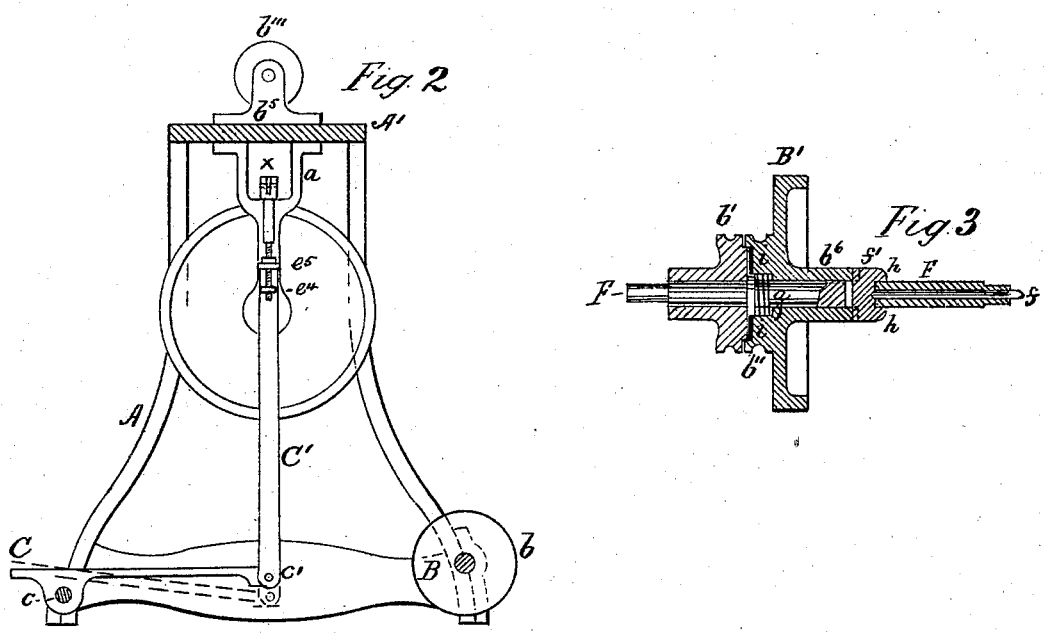
Fig. 2
Fig. 3
Witnesses
J. A. Lowndes
A. A. Lacey
Inventor
Daniel Whitlock
By Newton Cranford
atty
AM. PHOTO-LITHOGRAPHIC CO. N.Y. (OSBORNE'S PROCESS)

# UNITED STATES PATENT OFFICE.

DANIEL WHITLOCK, OF NEWARK, NEW JERSEY.

IMPROVEMENT IN MECHANISMS FOR OPERATING SEWING-MACHINES.

Specification forming part of Letters Patent No. 134,780, dated January 14, 1873.

*To all whom it may concern:*

Be it known that I, DANIEL WHITLOCK, of Newark, in the county of Essex, in the State of New Jersey, have invented certain Improvements in Mechanism for Operating Sewing-Machines, of which the following is a specification:

The object of this invention is to furnish a ready means for quickly stopping or retarding the motion of the machine, or for causing the live and idle parts to be in contact to put the machine in full motion instantly; and it consists in the construction and arrangement of the parts that produce the desired effect, as will be hereinafter fully described. This improvement is calculated to be attached to machines driven by constant power, but can as readily be attached to machines operated by treadle or crank.

In the drawing, Figure 1 is a side view of the machine, having some of the parts in section to better show the construction; Fig. 2 is an end view of the same; and Fig. 3, details of some of the parts.

A represents the framing that supports the machine, and A' the top or table. B is a horizontal shaft revolving in bearings attached to frame A, and from which the power is applied to the machine through pulley $b$, that is fast on said shaft, and revolves with it. $b'$ is a loose pulley revolving on shaft F, and is placed in a parallel plane with pulley $b$ on shaft B, and gets its motion or revolution through a band around itself and pulley $b$. $a\ a$ are gallowses or supports for shaft F and other parts of the machine, and project downward from the under side of the top or table A'. B' is a wheel on shaft F, and is held from revolving on said shaft by a groove in the end of hub $b^6$, Fig. 3, fitting onto a key, $f'$, that is in a mortise that goes transversely through shaft F, and can slide therein longitudinally with the shaft. This key is kept from falling out by the projections $h\ h$ on either end, which are just wide enough to go through the mortise and far enough apart to embrace the diameter of the shaft. $g$ is a spiral spring inserted in an opening in pulley $b''$ and around the shaft F, and bears against the inner face of a tight collar in pulley $b'$, that is loose on shaft F, and forces the hub $b^6$ of wheel B' having the groove which fits onto and hard against the key $f'$, which prevents all wear of parts, as all revolve together. $f$ is a loose center-pin, freely sliding longitudinally in a center-bore in shaft F, as seen in Fig. 3, with its inner end bearing against the sliding key $f'$, and its outer end made conical. $i$ is an annular piece of rubber or other tough flexible substance inserted in a recess in the pulley $b''$, part of wheel B', around the shaft F. C is a foot-treadle on horizontal rock-shaft $c$, and pivoted at $c'$ to upright connecting-rod C'. Upright connecting-rod C' is pivoted at its upper end to the outer end of horizontal pivoted bar D at $c''$. Bar D is pivoted at its inner end to arm $a'$ on the support $a$, and so that its outer end can freely vibrate up and down. $d$ is an arm extending downward and slightly inward from the pivotal point of arm D to arm $a'$ at $c'''$ and bears against the outer end of sliding pin $f$. $d$ is a projecting arm at the extreme outer end of bar D, and has a vertical hole through it at a little distance from the point where the connecting-rod C' and bar D are pivoted, and receives an upright connecting-rod, $e$, that is pivoted to horizontal lever $e''$ at $e'$, and has a screw-thread cut on the lower part of its length, with screw-nut $e^4$ below and nut $e^5$ above the arm to adjust bar D upon the connecting-rod $e$ at the proper place. Lever $e''$ passes through opening $x$ in support $a$ and between lugs $a''$ thereon, and to which it is pivoted at $e'''$, and extending onward and inclined downward, and terminating over wheel B in a brake, E. This movement, when thus constructed, will, by a motion of the foot, force the brake E hard upon the periphery of the wheel B' and stop its revolution and throw it out of frictional contact with the live pulley $b'$, and, by a reverse oscillation of the treadle, will raise the brake from wheel B', and at the same time force pin $f$ against key $f'$, carrying it and wheel B' and pulley $b''$ with the rubber $i$ therein hard against the live pulley $b'$ and the machine is in motion; or, by only a partial oscillation of the treadle, the wheel B' and pulley $b''$ may be retarded in its motion, as the friction-surface $i$ may slip upon the inner surface of live pulley $b'$, thus regulating the motion of the machine, or stopping it entirely, while the live pulley $b'$ may continually revolve with the power that drives it. Pulley $b'''$, upon a horizontal shaft, $b^4$, in standards $b^5$ on the top of the machine, receives its motion from pulley $b''$ on wheel B', and through this pulley $b'''$, the needle of the machine gets its motion, and when the pulley $b'''$ ceases to revolve the needle will be still.

Having thus described my invention, what I claim, and desire to secure by Letters Patent, is—

1. The combination for simultaneously throwing a frictional surface out of contact with a live or movable surface and forcing the pressure of a brake upon a wheel on a secondary shaft and thereby stop the motion of said wheel or vary it, in the manner and for the purpose substantially as described.

2. The combination of the treadle C, connecting-rod C', bar D having arms or projection $d$, sliding pin $f$ in shaft F, key $f'$, wheel B', spring $g$, and friction-surface $i$ with the live pulley $b'$, substantially in the manner and for the purpose described.

3. The combination of the treadle C, connecting-rod C', arm D having projecting arm $d'$, connecting-rod $e$ having gage-nuts $e^4$ and $e^5$, and pivoted arm $e''$ terminating in brake E with the wheel B' on shaft F, in the manner and for the purpose substantially as described.

DANIEL WHITLOCK.

Witnesses:
JOHN ROSE,
M. H. KING.